United States Patent [19]

Stoessel

[11] Patent Number: 5,102,984

[45] Date of Patent: Apr. 7, 1992

[54] PREPARATION OF LINEAR POLYCARBONATES FROM CYCLIC OLIGOMER COMPOSITIONS USING ULTRASONIC CAVITATION

[75] Inventor: Steven J. Stoessel, Schenectady, N.Y.

[73] Assignee: General Electric Company, Schenectady, N.Y.

[21] Appl. No.: 718,478

[22] Filed: Jun. 21, 1991

[51] Int. Cl.⁵ .............................................. C08J 03/28
[52] U.S. Cl. .................................. 528/370; 523/300; 524/789; 264/23
[58] Field of Search ........................ 523/300; 528/370; 264/23

[56] References Cited

U.S. PATENT DOCUMENTS

| | | | |
|---|---|---|---|
| 3,862,078 | 1/1975 | Burke, Jr. | 523/335 |
| 4,701,538 | 10/1987 | Rosenquist et al. | 528/370 |
| 4,778,875 | 10/1988 | Stewart | 528/370 |
| 4,933,432 | 6/1990 | Yokoyama et al. | 528/498 |

*Primary Examiner*—Paul R. Michl
*Assistant Examiner*—Andrew E. C. Merriam
*Attorney, Agent, or Firm*—William H. Pittman; James C. Davis, Jr.

[57] ABSTRACT

Cyclic polycarbonate oligomers are polymerized by ultrasonic cavitation, either using a positive pressure of the ultrasonic probe or in combination with the action of at least one cyclic polycarbonate oligomer polymerization catalyst. Polymerization by this method may be effected on neat cyclic polycarbonate oligomers or on mixtures thereof with reinforcing agents such as glass fibers.

17 Claims, No Drawings

PREPARATION OF LINEAR POLYCARBONATES FROM CYCLIC OLIGOMER COMPOSITIONS USING ULTRASONIC CAVITATION

This invention relates to the preparation of linear polycarbonates and similar condensation polymers, and more particularly to a method for their preparation from cyclic oligomer compositions.

The conversion of low molecular weight cyclic aromatic carbonate polymers to linear polycarbonates is known. Reference is made, for example, to the following U.S. patents:

| | |
|---|---|
| 3,155,683 | 3,386,954 |
| 3,274,214 | 3,422,119. |

More recently, cyclic polycarbonate oligomer mixtures have been prepared and converted to linear polycarbonates, often of very high molecular weight, by contact with a wide variety of polycarbonate formation catalysts. Reference is made, for example, to the following U.S. patents:

| | |
|---|---|
| 4,605,731 | 4,778,875 |
| 4,650,852 | 4,853,459 |
| 4,701,519 | 4,927,910 |
| 4,740,583 | 4,927,911. |

In addition, salicylate salts and Wittig salts or their precursors are disclosed as catalysts in copending, commonly owned applications Ser. Nos. 07/534,566 and 07/656,347, respectively. The disclosures of these patents and applications are incorporated by reference herein.

The catalysts disclosed in the aforementioned patents and applications have activity that varies over a wide range of conditions. Some are very fast, initiating polymerization almost immediately upon contact with the cyclic polycarbonate oligomers in the liquid state. Others initiate polymerization only at a very slow rate. Still others are inactive or nearly inactive below a threshold temperature but initiate rapid polymerization above that temperature. It is possible, therefore, to select a chemically active catalyst for almost any desired type of polymerization operation.

By their very nature, however, all of the known cyclic polycarbonate polymerization catalysts are unpredictable to some degree with regard to polymerization rate. An induction period of some length is almost always required, and the precise length thereof varies with the reaction conditions. Since fibrous and other reinforcements used in composite manufacture frequently have catalytic properties themselves, their presence may introduce a further variable. Accordingly, polymerization methods which are capable of still closer control are constantly being sought.

The present invention is based on the discovery that ultrasonic cavitation of a cyclic polycarbonate oligomer composition can, under certain conditions, effect conversion of the cyclics to linear polycarbonate. Such conversion is very rapid, beginning almost instantaneously upon activation and requiring only a few minutes for completion. It is also possible to employ ultrasonic cavitation in the presence of a cyclic polycarbonate polymerization catalyst, under somewhat less stringently defined conditions. The result in this case is a polymerization rate substantially greater and capable of more precise control than is provided by catalytic action alone.

The present invention is a method for preparing a resinous composition which comprises cavitating at least one cyclic polycarbonate oligomer by application of a high power ultrasonic probe at a temperature in the range of about 225°–350° C.

The cyclic polycarbonate oligomer compositions useful in the method of this invention generally comprise a plurality of structural units of the formula

wherein at least about 60% of the total number of R values are divalent aromatic organic radicals, the balance thereof being aliphatic, alicyclic or aromatic organic radicals. Such compositions include dimers, trimers, and tetramers, as well as cyclic polycarbonate oligomer mixtures.

The R values may be different but are usually the same, and may be aliphatic, alicyclic, aromatic or mixed; those which are aliphatic or alicyclic generally contain up to about 8 carbon atoms. Suitable R values include ethylene, propylene, trimethylene, tetramethylene, hexamethylene, dodecamethylene, 1,4-(2-butenylene), 1,10(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is also incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all R radicals are hydrocarbon radicals.

Preferably at least about 80% of the total number of R values in the cyclic oligomer mixtures, and most desirable all of said R values, are aromatic. The aromatic R radicals preferably have the formula

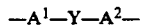

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, hexafluoroisopropylidene, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about 5% of such linear oligomers, if any, are present.

The mixtures also usually contain low percentages, if any, of polymers (linear or cyclic) having a degree of polymerization greater than about 30. For the purposes of this invention, which often require relatively very low viscosities at the temperatures at which the oligomers are liquid, it is usually preferred and sometimes essential for the proportion of such polymers having a high degree of polymerization to be low, generally no higher than about 5%. Removal of such polymers, when necessary, is easily achieved by precipitation with a non-solvent, as disclosed, for example, in the aforementioned U.S. Pat. No. 4,644,053.

As used herein, "ultrasonic" refers to high frequency waves above the limit of human hearing, beginning at a frequency of about 20 kHz. The term "sonication" is used generally to denote ultrasonic activation in any form. "High power" sonication involves a power level of at least about 800 watts, in contrast to operations such as ultrasonic cleaning which require substantially lower power levels.

The invention requires sonication under conditions which cause cavitation of the cyclic polycarbonate oligomers. In one aspect of the invention, cavitation is achieved when a positive pressure is exerted by an activated ultrasonic probe on the oligomer composition. The amount of pressure exerted is not critical and will normally be very small, typically at least about 0.5 kg./cm.$^2$. Under these conditions, and at temperatures in the range of about 225°–350° and preferably about 250°–300° C., sonication times as short as five minutes are effective to cause essentially complete polymerization of the cyclic polycarbonate oligomers without the need for a cyclic oligomer polymerization catalyst.

Another aspect of the invention is a method which comprises applying ultrasonically cavitating the cyclic polycarbonate oligomers at a similar temperature in the presence of an effective amount of polymerization of at least one cyclic polycarbonate oligomer polymerization catalyst. This aspect of the invention does not require application of pressure by the probe on the cyclic oligomers. All that is apparently required is a degree of cavitation effective to cause localized heating to a degree which activates the catalyst. The result is a substantial increase in polymerization rate as compared to catalytic action in the absence of ultrasound, with a 500–1,000% increase in rate being typical.

In this aspect of the invention, any of the known cyclic polycarbonate polymerization catalysts, as disclosed, for example, in the above-identified patents and applications, may be employed. Typical catalyst proportions are in the range of about 0.001–2.0 mole percent, based on structural units in the oligomers. This aspect of the invention has been found particularly effective with the use of monobasic metal salicylates, as illustrated by lithium salicylate, as catalysts.

The method of this invention may be employed in numerous embodiments. They have in common the sonication operation, which is the effective polymerization initiating step. Therefore, close control of polymerization initation is possible; in particular, initiation may be delayed until the optimum time therefor, as when a large mold has been filled.

As previously noted, sonication may be the only polymerization enhancing operation, or it may be used in combination with various cyclic polycarbonate oligomer catalysts. When a catalyst is employed, it may be incorporated in the cyclic polycarbonate composition by various means, depending on the desired rapidity of initiation of cyclics polymerization.

For example, in situations where a mold can be rapidly filled and it is desired that polymerization begin promptly, the cyclics may be dissolved in a suitable solvent therefor such as methylene chloride and the catalyst may be intimately dispersed in the resulting solution. A particularly effective method of dispersion is dissolution of the catalyst in a relatively small amount of a liquid in which it is soluble, such as acetone, followed by addition of the resulting solution to the cyclics solution. The solvents are then evaporated to produce an intimate blend of the catalyst with the cyclics composition. Such blend is stable at ambient temperatures.

The invention is useful with compositions consisting essentially of the above-described cyclic polycarbonate oligomers. It is also useful with composite "prepregs" (i.e., curable filled compositions), comprising said cyclics in combination with inert reinforcing agents, especially fibers such as glass, polyamide or carbon fibers. The proportion of reinforcing agent in such prepregs is generally up to about 70% by volume.

The method of this invention is illustrated by the following examples. Molecular weights are weight average and were determined by gel permeation chromatography.

EXAMPLE 1

A steel die 25.5 mm. in diameter was heated to 250° C. and charged with 2 grams of a bisphenol A cyclic polycarbonate oligomer mixture comprising principally oligomers having degrees of polymerization from 2 to 6. When the cyclics had melted, they were contacted at a pressure of about 0.5 kg./cm.$^2$ with an ultrasonic probe generator having a titanium carbide tip about 25.4 mm. in diameter and operating at 20 kHz. Contact was maintained for a period of 5 minutes. There was obtained 95% of the theoretical amount of a bisphenol A polycarbonate having a molecular weight of 87,700. A control, using identical conditions except that the ultrasonic probe was applied without sonication, afforded no polymer.

EXAMPLE 2

The procedure of Example 1 was repeated, substituting for the cyclic polycarbonate oligomers a mixture of 50% (by weight) of said oligomers and 50% glass fiber, obtained by dissolving the cyclics in methylene chloride, adding the glass fibers to form a slurry and evaporating the methylene chloride in an oven. There was obtained 95% of the theoretical amount of a bisphenol A polycarbonate composite in which the polycarbonate had a molecular weight of 86,600. A control, using identical conditions except that the ultrasonic probe was applied without sonication, afforded only a 34% yield of polycarbonate having a molecular weight of 42,400.

EXAMPLE 3

To 2 grams of the cyclic polycarbonate oligomer mixture employed in Example 1 was added, as a powder, 0.2 mole percent (based on structural units in the polycarbonate oligomers) of lithium salicylate. The mold was charged as in Example 1 and the ultrasonic probe was placed in contact with the cyclics without exertion of pressure, for two minutes. There was obtained a 100% yield of bisphenol A polycarbonate having a weight average molecular weight of 98,100.

EXAMPLE 4

The procedure of Example 3 was repeated, except that the lithium salicylate was dispersed in a methylene chloride solution of the cyclic polycarbonate oligomers after which the methylene chloride was removed by evaporation. There was obtained an 89% yield of a bisphenol A polycarbonate having a molecular weight of 76,300.

What is claimed is:

1. A method for preparing a resinous composition which comprises cavitating at least one cyclic polycarbonate oligomer by application of a high power ultrasonic probe at a temperature in the range of about 225°–350° C.

2. A method according to claim 1 wherein a mixture of cyclic polycarbonate oligomers is employed.

3. A method according to claim 2 wherein the cyclic polycarbonates comprise structural units of the formula

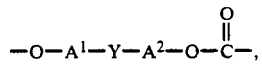

wherein each of $A^1$ and $A^2$ is a monocyclic divalent aromatic radical and Y is a bridging radical in which one or two atoms separate $A^1$ from $A^2$.

4. A method according to claim 3 wherein a positive pressure is exerted by said ultrasonic probe.

5. A method according to claim 4 wherein the temperature is in the range of about 250°–300° C.

6. A method according to claim 5 wherein $A^1$ and $A^2$ are each p-phenylene and Y is isopropylidene.

7. A method according to claim 4 wherein the cyclic polycarbonate oligomers are combined with at least one reinforcing agent.

8. A method according to claim 7 wherein the reinforcing agent is a fibrous reinforcing agent.

9. A method according to claim 8 wherein the reinforcing agent is glass fibers.

10. A method according to claim 3 wherein there is also present at least one cyclic polycarbonate oligomer polymerization catalyst.

11. A method according to claim 10 wherein the catalyst is present in the amount of about 0.001–0.5 mole percent, based on structural units in the oligomer composition.

12. A method according to claim 11 wherein the catalyst is a monobasic metal salicylate.

13. A method according to claim 12 wherein the catalyst is lithium salicylate.

14. A method according to claim 12 wherein the temperature is in the range of about 250°–300° C.

15. A method according to claim 10 wherein the cyclic polycarbonate oligomers are combined with at least one reinforcing agent.

16. A method according to claim 11 wherein the reinforcing agent is a fibrous reinforcing agent.

17. A method according to claim 12 wherein the reinforcing agent is glass fibers.

* * * * *